United States Patent [19]

Kiehl

[11] 4,000,572
[45] Jan. 4, 1977

[54] MAILING VIEWER FOR SLIDES AND THE LIKE

[75] Inventor: Paul G. Kiehl, St. Louis, Mo.

[73] Assignee: Visual Data Corporation, Chesterfield, Mo.

[22] Filed: Apr. 15, 1976

[21] Appl. No.: 677,017

Related U.S. Application Data

[60] Continuation of Ser. No. 404,019, Oct. 5, 1973, abandoned, which is a division of Ser. No. 307,107, Nov. 16, 1967, Pat. No. 3,800,452, which is a continuation of Ser. No. 57,179, July 22, 1970, abandoned.

[52] U.S. Cl. .................................. 40/63 A; 350/140
[51] Int. Cl.² .................. G02G 27/22; G09F 11/30
[58] Field of Search ............ 40/63 A, 64 A, 86 A, 40/70 A, 106.1; 350/140, 70, 250

[56] References Cited

UNITED STATES PATENTS

| 1,553,906 | 9/1925 | Marette | 40/86 A |
| 2,071,121 | 2/1937 | Harlow | 40/63 A |
| 2,117,910 | 5/1938 | Rossman | 40/63 A X |
| 2,615,366 | 10/1952 | Rothweiler | 40/63 A X |
| 3,005,378 | 10/1961 | Golden | 40/63 A X |
| 3,076,276 | 2/1963 | Pitchford | 40/63 A X |
| 3,178,842 | 4/1965 | Zimmerman | 40/63 A X |
| 3,469,336 | 9/1969 | Halperin | 40/120 X |
| 3,488,872 | 1/1970 | Levy | 40/63 A |
| 3,529,371 | 9/1970 | Moore | 40/120 |
| 3,582,182 | 6/1971 | Martin | 350/140 |

FOREIGN PATENTS OR APPLICATIONS

| 353,278 | 7/1931 | United Kingdom | 40/86 A |

Primary Examiner—John F. Pitrelli
Attorney, Agent, or Firm—Rogers, Eilers & Howell

[57] ABSTRACT

The disclosed structure is a collapsible integral three-panel flat mailing slide viewer including a removable adapter for viewing film strips. The viewer may be formed for 2-D or 3-D slides.

11 Claims, 16 Drawing Figures

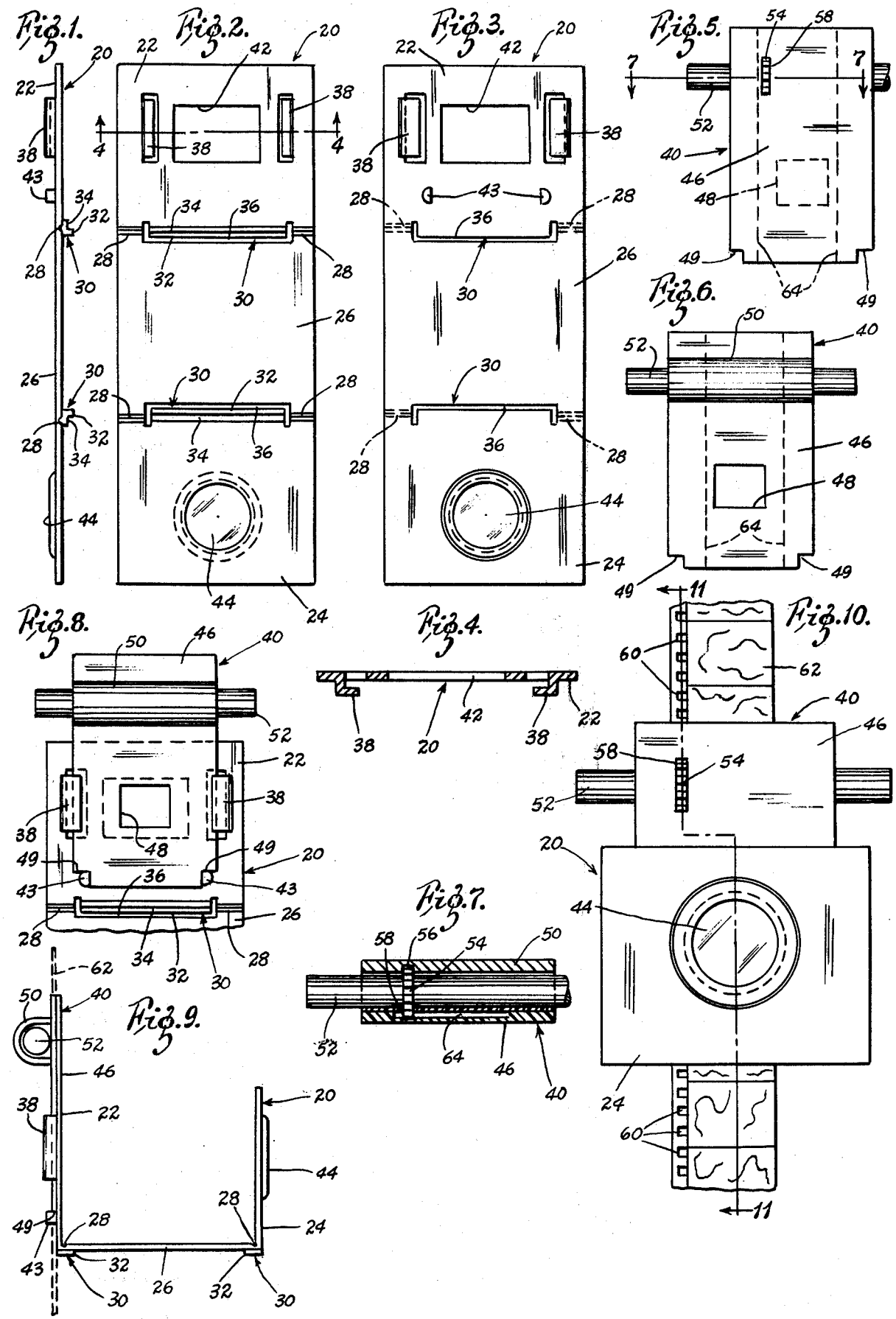

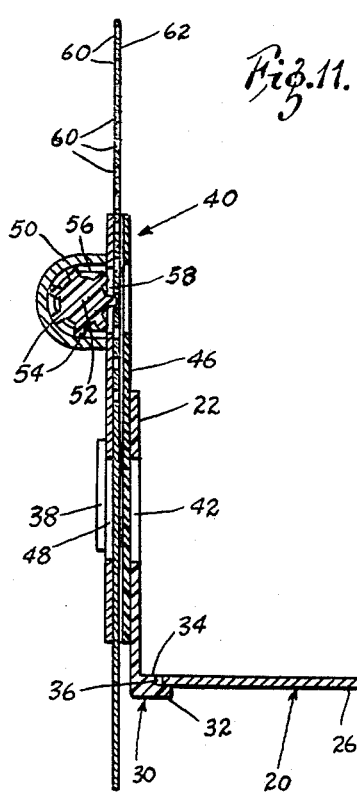
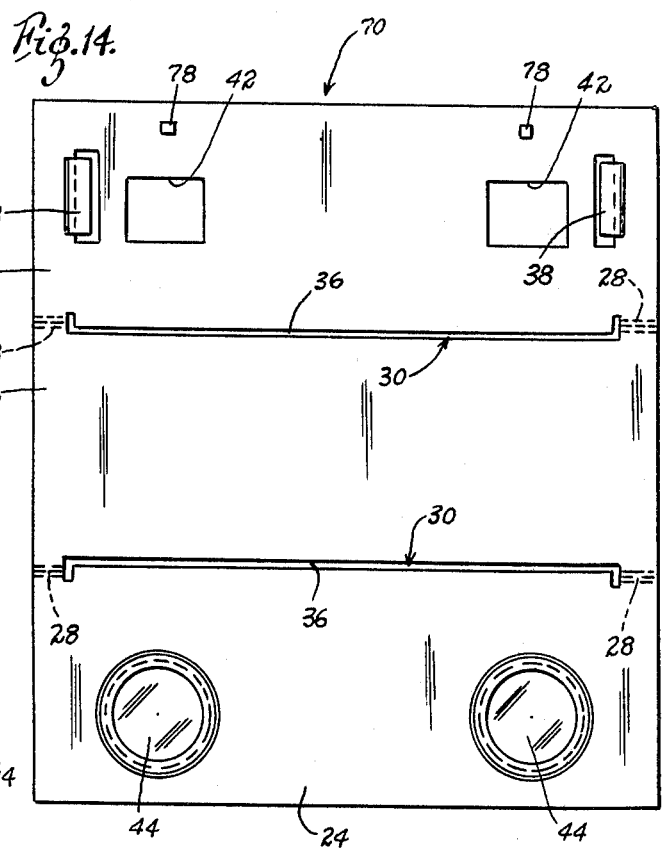
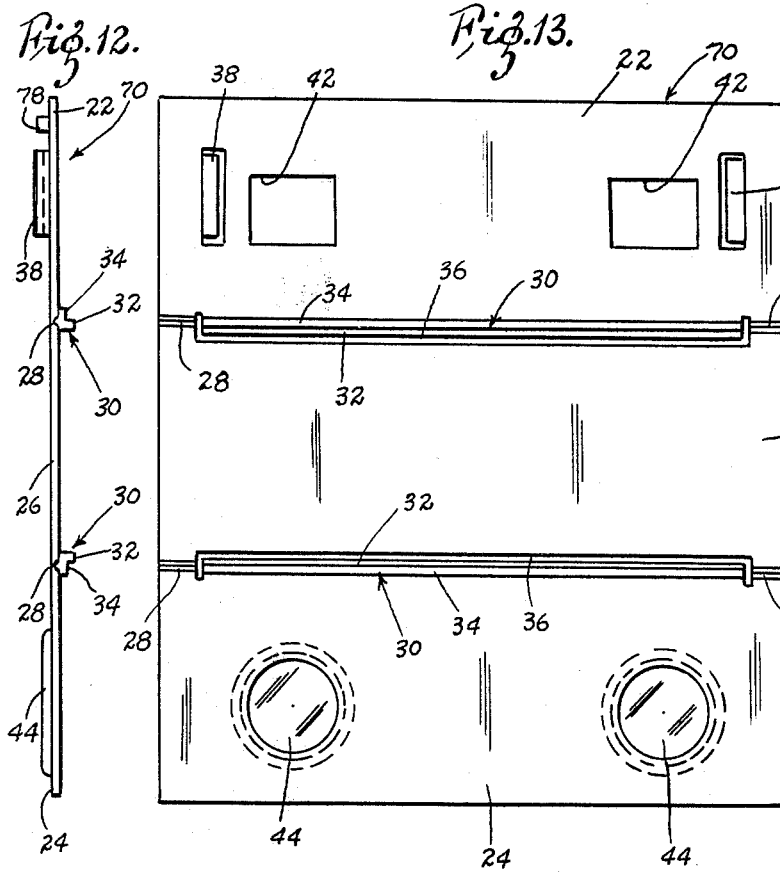
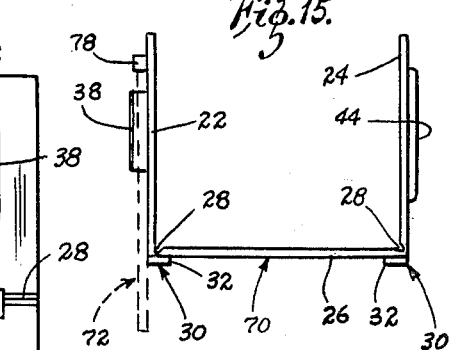
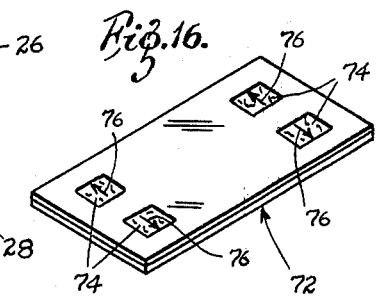

MAILING VIEWER FOR SLIDES AND THE LIKE

BACKGROUND OF THE INVENTION

Reference to Related Applications

This application is a continuation of Ser. No. 404,019, filed Oct. 5, 1973, now abandoned; which is a division of Ser. No. 307,107, filed Nov. 16, 1972, now U.S. Pat. No. 3,800,452; which is a continuation of application Ser. No. 57,179, filed July 22, 1970, now abandoned.

Field of the Invention

The present invention related generally to the photographic art, and more particularly to a novel collapsible three-panel flat mailing slide viewer including a removable adapter for viewing film strips. The viewer may be formed for 2-D or 3-D slides.

Description of the Prior Art

The prior art contains many film viewers. However, there has long existed the need for an inexpensive, durable, flat mailable viewer adapted for use with slides and films, formable to receive 2-D or 3-D slides, which can be readily employed for its intended purpose.

SUMMARY OF THE INVENTION

In brief, the present novel viewer includes three integral panels hinged for pivotal movement of an end lens panel and an end picture panel from flat positions to parallel viewing positions. A releasable flange stop maintains each end panel in parallel position and at right angles to the central panel. A removable novel adapter permits viewing of film strips. The viewer may be formed to accept 2-D or 3-D slides.

Hence, objects of the present invention are to provide a novel film viewer which fulfills the stated long-felt need in the art, which incorporates three integral panels collapsible to flat form for mailing and storage and pivotable into viewing form, which is adapted for long service, which is simple to use effectively, which includes an adapter for film strip viewing, which is adaptable to 2-D and to 3-D forms, and which otherwise fulfills the objects and advantages sought.

BRIEF DESCRIPTION OF THE DRAWINGS

FIG. 1 is a side elevational view of a collapsible viewer for 2-D slides adaptable for film, such as film strips, incorporating the teachings of the present invention;

FIG. 2 is a front view thereof;

FIG. 3 is a rear view thereof;

FIG. 4 is a transverse cross-sectional view taken on substantially the line 4—4 of FIG. 2;

FIG. 5 is a rear view of an adapter used with the viewer of FIGS. 1–4 to look at film strips or film segments;

FIG. 6 is a front view thereof;

FIG. 7 is a transverse cross-sectional view on substantially the line 7—7 of FIG. 5;

FIG. 8 is a fragmentary rear view of the viewer with the film adapter attached;

FIG. 9 is a side elevational view of the viewer with adapter attached and folded into position for viewing;

FIG. 10 is an enlarged front view of the viewer with adapter and film;

FIG. 11 is a vertical longitudinal cross-sectional view taken on substantially the line 11—11 of FIG. 10;

FIG. 12 is a side elevational view of a collapsible 3-D viewer incorporating the teachings of the present invention;

FIG. 13 is a rear view thereof;

FIG. 14 is a front view thereof;

FIG. 15 is an end view thereof; and

FIG. 16 is an isometric view of a two-picture 3-D slide.

DESCRIPTION OF THE PREFERRED EMBODIMENT

Referring to the drawings more particularly by reference numerals, 20 indicates generally a collapsible integral mailable viewer, preferably of suitable plastic, including an end film window panel 22, an end lens supporting panel 24, and a central connecting panel 26. Each of the film window panel 22 and lens support panel 24 is connected to the panel 26 by laterally spaced thin integral hinge webs 28. Integral with each panel 22 and 24 between the hinge webs is an elongated stop and positioning rib or flange 30 of the cross section clearly shown in FIG. 11. Each rib 30 includes a step or shelf 32 and shoulder 34 at right angles thereto. An opposed notch 36 is formed in each adjacent side of the connecting panel 26 permitting the ribs 30 to extend therein, as is clear from FIGS. 2 and 3. In moving the end panels 22 and 24 from the flat positions of FIGS. 1–3 to the operative viewing positions of FIGS. 9–11, the ribs 30 pivot through the notches 36 in a tight squeeze action and maintain said end panels 22 and 24 at their 90° viewing positions to the connecting panel 26 by engagement of the shoulders 34 against the edges of the notches 36 and the shelves 32 against the rear of the connecting panel 26, as is clear from the drawings.

The panel 22 includes opposed integral wings 38 on the outer surface adapted to support optionally a standard slide or a film strip adapter 40, a picture window 42 between the wings 18, and spaced stops 43 below the wings 38 adapted to stop and position slides and an adapter. The panel 24 supports a viewing lens 44.

The adapter 40, which may be of translucent plastic, includes an elongated base or panel 46 of a width receivable by the wings 38 for support thereof (FIGS. 5–11). A window 48 is provided for registering with the window 42. Preferably, the window 48 is closed rearwardly of the film position with a membrane of the translucent plastic which aids in diffusing the light to improve viewing. Lower corner notches 49 are provided to engage the stops 43. An integral transversely disposed sleeve 50 rotatably receives a shaft 52 on which are formed integral pinion or cog teeth 54 which successively extend through a slot 58 for operative engagement with the spaced border openings 60 of a film strip 62, an internal annular groove 56 being provided in the sleeve 50 for the remainder of the rotary travel of the teeth 54 (FIGS. 5, 7, 10 and 11). The shaft 52 extends from both ends of the sleeve 50 for rotation through movement of either end. The cog teeth 54 prevent axial movement of the shaft 52. A central longitudinal channel 64 is provided in the rear face of the base 46 for receiving the film strip 62 and confining it against the outer face of the panel 22 as it is viewed or is supported in rest position.

In FIGS. 12–15 is disclosed a 3-D collapsible integral mailable viewer 70 which structurally is essentially the same as the viewer 20, and the same reference numerals are used to designate corresponding parts, portions, and the like. The wings 38 receive 3-D slides 72, each of which has two picture pairs 74 disposed in opposed relation, as indicated by the arrows 76. The slide 72 may include one picture pair 74. Stops 78 above the picture windows 42 position a selected pair of pictures 74 for viewing. No adapter 40 is provided.

It is apparent that there has been provided a novel collapsible three-panel flat mailing slide viewer which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which wll be obvious to those skilled in the art, are contemplated as within the scope of the present invention which is limited only by the claims which follow.

What is claimed is:

1. A collapsible mailing viewer, and advance mechanism for film strips, which viewer is particularly adapted for mailing in a flat mailing envelope and which may be folded and unfolded between a generally flat configuration for mailing or storing and fixed viewing configuration for viewing the film strips, and which is of light weight, one-piece construction, and which advance mechanism is mountable to said viewer for successively viewing frames of the film, the combination comprising a molded plastic strip, hinge means spaced inwardly from each end of the strip, the portion of the strip between the hinge means defining a central panel, the remaining outer portions of the strip defining a lens panel and a film receiving panel which are foldable about the hinge means relative to the central panel, the hinge means being molded of plastic as part of the strip to define a one-piece molded unit, snap release locking means at each of the hinge means for automatically locking the lens and film receiving panels in fixed, generally opposed parallel positions when folded to said positions, the snap release locking means also being molded of plastic with the plastic strip and hinge means providing a totally one-piece unit for minimal assembly, labor, and expense, and an advance mechanism removably mounted on said film receiving panel, said advance mechanism including means for moving a film strip for successively viewing picture frames, whereby the viewer can be mailed in its flat configuration in a standard flat envelope and quickly and surely releasably locked in its viewing configuration by simply folding the lens and film receiving panels to said viewing configuration to engage the snap release locking means, the viewer and advance mechanism combination providing a light weight, inexpensive, and easily assembled device for viewing film strips making it particularly useful in advertising and promotion through the mail.

2. The combination of claim 1 further comprising a film strip receiving slot, and a rotatable sprocket adapted to engage with feed apertures of the film strip.

3. The combination of claim 2 wherein the film receiving panel has an opening therein, the combination further comprising a translucent panel, means for mountng the translucent panel to overlie the opening, and means for mounting the film strip between the opening and the translucent panel.

4. The combination of claim 2 wherein said film strip moving means includes a handle member operable from both sides of the viewer.

5. The combination of claim 1 wherein the hinge means includes grooves extending part way through the plastic along the hinge junctions leaving integral webs forming the hinges.

6. The combination of claim 1 wherein each snap release locking means further comprises an angularly disposed flange formed near the edge of one of the adjacent panels at the hinge means, an opening through the strip at the hinge means through which the flange moves upon folding and unfolding the one adjacent panel relative to the other, the opening having an edge which is fixed relative to the other adjacent panel and positioned relative to the flange for engagement of the flange and the edge with the viewer in its viewing configuration so as to resist unfolding, the flange and edge being sufficiently resilient to allow the flange to pass from engagement with one side of the edge, through the opening, and into engagement with the other side of the edge upon forcibly folding or unfolding one adjacent panel relative to the other to and from the viewing configuration.

7. The combination of claim 6 wherein the flange is formed at approximately 90° relative to the panel with which it is associated.

8. A collapsible flat mailing viewer and advance mechanism for viewing film strips comprising in combination a central panel, a lens panel, a film receiving panel, hinge means for joining the lens and film panels along opposite ends of said central panel with said central panel directly therebetween and for folding said lens and film panels about the hinge means relative to said central panel to an opposed generally parallel relation, and means for releasably maintaining said lens and film panels in opposed parallel relation for viewing of a film strip, an advance mechanism, means for removably mounting said advance mechanism to said film receiving panel, and slot means for receiving and holding a film strip at said film receiving panel with said film strip generally straight and parallel to said film receiving panel as it moves thereover for sliding movement of the film strip within the slot means for successively viewing picture frames, said slot means being unobstructed at opposite ends to permit movement of the film strip past opposite ends of the film receiving panel said slot means is oriented for movement of the film strip past top and bottom ends of the film receiving panel, said advance mechanism including means for moving the film strip within the slot means for successively viewing picture frames and a rotatable sprocket adapted to engage with feed apertures of the film strip, said sprocket being mounted with the axis normal to the direction of movement of the film strip.

9. The combination of claim 8 wherein the film receiving panel has an opening therein, the combination further comprising a translucent panel, means for mounting the translucent panel to overlie the opening, and means for mounting the film strip between the opening and the translucent panel.

10. The combination of claim 8 wherein said film strip moving means includes a handle member operable from both sides of the viewer.

11. The combination of claim 8 wherein the means defining the slot further comprises a panel member and means securing the panel member to overlie the film receiving panel, the slot being defined by and between the panel member and film receiving panel.

* * * * *